(12) United States Patent
Hara et al.

(10) Patent No.: US 6,323,613 B1
(45) Date of Patent: Nov. 27, 2001

(54) DRIVE UNIT WITH TWO COOLANT CIRCUITS FOR ELECTRIC MOTOR

(75) Inventors: Takeshi Hara; Yutaka Hotta; Masayuki Takenaka; Hiromichi Agata; Kozo Yamaguchi; Takahiro Kido; Naruhiko Kutsuna, all of Anjo (JP)

(73) Assignee: Aisin AW Co., Ltd. (JP)

( * ) Notice: Subject to any disclaimer, the term of this patent is extended or adjusted under 35 U.S.C. 154(b) by 0 days.

(21) Appl. No.: 09/558,164

(22) Filed: Apr. 26, 2000

(30) Foreign Application Priority Data

| Apr. 27, 1999 | (JP) | 11-120286 |
| Dec. 15, 1999 | (JP) | 11-356734 |
| Mar. 24, 2000 | (JP) | 12-088607 |

(51) Int. Cl.[7] ............ H02K 9/02; F02N 17/06; H05K 7/20
(52) U.S. Cl. .......... 318/471; 318/139; 318/472; 165/39; 361/699
(58) Field of Search .......... 318/139, 140–159, 318/600–669; 165/47, 35, 122, 80.2, 104.31, 39, 41, 80.4; 184/104.1, 6.12, 6.22; 244/134 R, 117 A; 62/243, 435, 498, 277, 238.6, 505, 452; 60/618, 671; 361/699

(56) References Cited

U.S. PATENT DOCUMENTS

| 5,121,788 | * | 6/1992 | Carollo | 165/47 |
| 5,217,085 | * | 6/1993 | Barrie et al. | 184/104.1 |
| 5,222,696 | * | 6/1993 | Brigham et al. | 244/134 R |
| 5,255,733 | * | 10/1993 | King | 165/39 |
| 5,265,437 | * | 11/1993 | Saperstein et al. | 62/243 |
| 5,540,061 | * | 7/1996 | Gommori et al. | 62/277 |
| 5,724,814 | * | 3/1998 | Ven et al. | 60/618 |
| 5,731,954 | * | 3/1998 | Cheon | 361/699 |
| 5,834,132 | * | 11/1998 | Hasegawa et al. | 429/62 |

FOREIGN PATENT DOCUMENTS

| 07099750 | 4/1995 | (JP) . |
| 7-288949 | 10/1995 | (JP) . |

* cited by examiner

Primary Examiner—Paul Ip
(74) Attorney, Agent, or Firm—Lorusso & Loud

(57) ABSTRACT

A drive unit includes an electric motor as a power source, and a simplified coolant circuit for cooling the electric motor. The drive unit further includes, in the drive unit case, a circulation passage L for coolant for cooling the motor M. A circulation passage F for a second coolant is provided separate from the circulation passage L for coolant. A heat exchange portion C within the circulation passage L for the first coolant is provided in the drive unit case for heat exchange with the second coolant in the circulation passage F, and the first coolant for cooling the electric motor is cooled by heat transfer to the second coolant in that heat exchange portion C. Accordingly, the coolant circuit in the drive unit case is simplified.

14 Claims, 15 Drawing Sheets

DRIVE UNIT WITH TWO COOLANT CIRCUITS FOR ELECTRIC MOTOR

BACKGROUND OF THE INVENTION

1. Technical Field of the Invention

The present invention relates to a drive unit in which an electric motor is used as a power source, and more particularly, to a cooling system in a drive unit for an electric vehicle or a hybrid drive unit.

2. Related Art

When an electric motor is used as a power source for a vehicle, the load exerted on the electric motor varies significantly with running conditions. Accordingly, in order to manage the heat generation with a heavy load, cooling is necessary. Therefore, conventionally, as disclosed in Japanese Patent Application Laid-Open No. 7-288949, the drive unit case is provided with a water passage for cooling the electric motor.

However, in the conventional system, the coolant passage is formed as tubing held in a spiral groove on the outer surface of the casing, with substantially half of the circular section of the tubing exposed and extending from the outer surface of the casing. Such structure is complicated, and is disadvantageous in terms of cost and space.

SUMMARY OF THE INVENTION

Therefore, a first object of the present invention is to provide a drive unit including a casing, an electric motor housed in the casing, and a simplified cooling structure incorporated into the drive unit casing.

An electric motor requires a controller which is an inverter in the case of an alternating current electric motor. Since a controller such as an inverter is connected to the electric motor by a power cable, it can be mounted anywhere, separate from the electric motor. However, for convenience of mounting on a vehicle, such a controller may be integrated with the electric motor. However, when the controller is integrated with the electric motor, the controller receives heat both as heat generated by its own elements and as heat from the electric motor transferred through the drive unit case. Therefore, such controllers require cooling.

Thus, a second object of the present invention is to provide a cooling system whereby both the inverter and the electric motor can be effectively cooled, even in the case of an inverter integrated with the drive unit case.

In order to achieve the first object as above, the present invention provides a drive unit including an electric motor, a drive unit case housing the electric motor, and a circulation passage for a first coolant for cooling the electric motor formed in the drive unit case. A circulation passage is provided for a second coolant separate from the circulation passage for first coolant and the circulation passage for the second coolant has a section which serves as a heat exchanger for heat exchange with the first coolant. The first coolant for cooling the electric motor is cooled by the heat transferred to the second coolant in the heat exchanger.

Where an inverter for controlling the electric motor is included, the circulation passage for the second coolant should include a portion for cooling the inverter.

Preferably, the heat exchanger portion is disposed downstream of the portion for cooling of the inverter in the circulation passage for the second coolant.

In order to attain the second object, the drive unit further includes an inverter panel for fixing the inverter to the case, and a flow passage for the second coolant is formed between the inverter panel and the drive unit case and is divided by a partition wall into first (upper) and second (lower) flow chambers.

The first chamber and the second chamber may be interconnected in series with the first chamber upstream of the second chamber. Alternatively, the first and second chambers may be connected in parallel to the circulation passage for the second coolant.

Furthermore, in any of the above-described embodiments, the drive unit may include an electric generator, a circulation passage for the first coolant for cooling the generator in the drive unit case, and an inverter for controlling the electric generator, the generator inverter being fixed to the inverter panel together with the motor inverter.

The drive unit case may have a coolant reservoir for the first coolant positioned facing the flow passage for the second coolant and the coolant reservoir may be divided into a coolant container for the electric motor and a coolant container for the electric generator. Orifices may be employed in the flow passage of the first coolant for distributing different proportions of coolant to the coolant container for the electric motor and to the coolant container for the electric generator. Each coolant container may have a dam in the vicinity of its exit. Further, a coolant container may be partially defined by the stator of the electric motor and/or the electric generator.

The first coolant may be passed through the rotor of the electric motor downstream of the coolant container, and discharged through a discharge hole provided in the rotor. Because the first coolant is brought into direct contact with the stator of the electric motor or the electric generator without being mediated by the drive unit case, the electric motor or the electric generator can be cooled more effectively.

By using as the first coolant a lubricant oil or ATF (automatic transmission fluid) which does not adversely affect, by corrosion or the like, the electric motor, very efficient heat transfer can be obtained through direct contact between the electric motor and the coolant, and moreover, the heat conveyed to the coolant by heat transfer can be discharged efficiently to the second coolant at one heat exchanger. Accordingly, the motor can be cooled efficiently without a complicated circulation passage for the first coolant passing through the drive unit case.

The first coolant for cooling the electric motor may be cooled by the second coolant which also cools the inverter(s) required for motor and/or generator control. In such a structure, the second coolant for cooling the inverter is also used for the (indirect) cooling of the electric motor, thereby making it possible to simplify the cooling structure of the drive unit. Where the area of heat exchange between the first and second coolants is downstream of the area of heat exchange between the second coolant and the inverter it is possible to prevent the heat of the first coolant, received from the electric motor, from being transferred to the inverter which has a heat tolerance lower than that of the electric motor.

Where the second coolant does not directly cool the electric motor, but simultaneously cools both the inverter and the first coolant which cools the motor, the heat from the electric motor is reduced, relative to direct heat transfer, by heat exchange between the second coolant and the first coolant, and thus it is possible to prevent the temperature of the second coolant from rising above the maximum temperature tolerated by the inverter.

In an alternative embodiment, the second coolant does not simultaneously cool the electric motor and the inverter. Instead, it first cools the inverter through the inverter panel and then cools the electric motor and (optionally) generator through the drive unit case. Therefore, it becomes possible to conduct cooling according to the individual cooling requirements of the inverter, electric motor and (optionally) generator, respectively, by a single coolant. Thus, it is possible to cool the inverter, the electric motor and (optionally) generator efficiently by a simple flow passage construction. Also, since the space between the integrated inverter and the drive unit case is used as a space for flow of coolant for cooling the inverter and the electric motor, it is possible to avoid the conventional complicated construction which include a coolant passage around the drive unit case, thereby improving space efficiency and reducing costs.

In yet another embodiment with parallel and independent coolant flows through the first chamber and the second chamber, it is possible to cool the inverter simultaneously with the motor, and (optionally) the generator, and further it is possible to prevent the heat from the electric motor and generator from being transferred to the inverter.

In embodiments wherein the second coolant does not directly cool the electric motor and the electric generator but, rather, simultaneously cools the inverter and the first coolant for cooling the electric motor and the electric generator, the heat from the electric motor and the electric generator is reduced, relative to direct heat transfer, by heat exchange between the second coolant and the first coolant, and thus it is possible to prevent the temperature of second coolant from rising above the heat tolerance of the inverter.

By providing a coolant container in the circulation passage for the first coolant, heat exchange between the first coolant and the second coolant is facilitated, thereby improving heat exchange efficiency.

The teachings of Japanese Application No. 11-120286 filed Apr. 27, 1999, Japanese Application No. 11-356734 filed Dec. 15, 1999 and Japanese Application No. 2000-88607 filed Mar. 24, 2000 inclusive of their specifications, drawings, claims and abstracts are incorporated herein by reference.

EMBODIMENTS OF THE INVENTION

Hereinafter, embodiments of the present invention will be explained with reference to the drawings.

Figure 1:
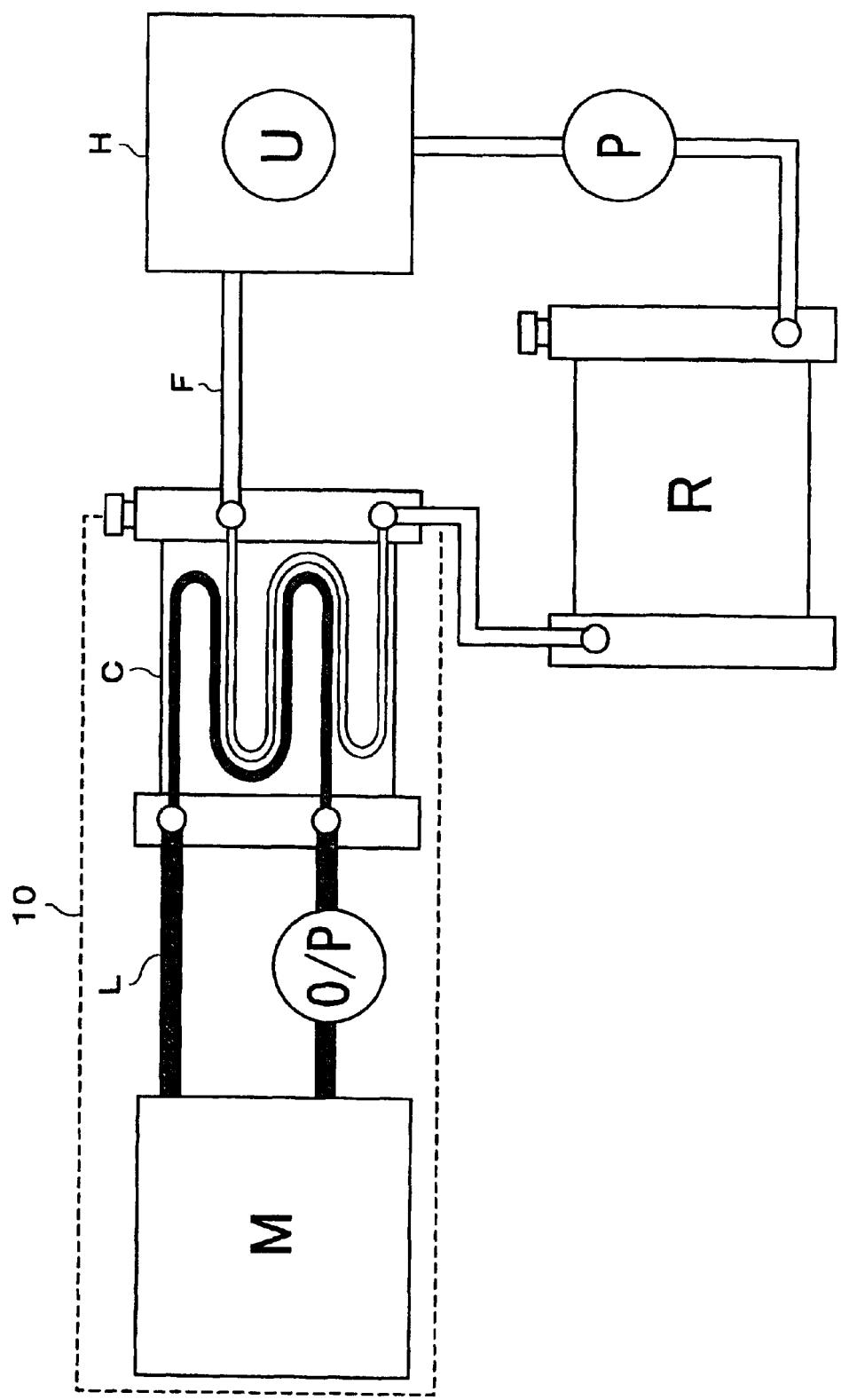
FIG. 1 is a schematic diagram of a first embodiment of the present invention.

FIG. 1 shows a first embodiment of a drive unit of the present invention as including an electric motor M, a case 10 and a circulation passage L for a first coolant (in this embodiment, oil) for cooling the electric motor M in the drive unit case 10. A circulation passage F for a second coolant (in this embodiment, cooling water), separate from the circulation passage L for the first coolant, has a heat exchange portion (in this embodiment, an oil cooler) C for heat exchange with the circulation passage L for the first coolant. The first coolant is cooled by heat exchange with the second coolant at the heat exchange portion C.

In the first embodiment, the drive unit is provided with an inverter U for controlling the motor M, and the circulation passage F is used as a cooling circuit for cooling the inverter U. For this purpose the circulation passage F (for the second coolant) includes a cooling portion H for cooling the inverter U. A radiator R is included in the cooling circuit for cooling the second coolant. The oil cooler C functioning as the heat exchanger is disposed downstream of the cooling portion H for the inverter U, in the circulation passage F. In FIG. 1, O/P denotes an oil pump, and P denotes a water pump.

As used herein, the term "inverter" means a power module comprising a switching transistor for converting the direct current from a battery power source into alternating current (three phase alternating current in the case of a three phase alternating current electric motor), accessory circuit elements, and a circuit substrate.

In the above-described drive unit, by using oils such as lubricant oil and ATF (automatic transmission fluid), which do not have ill effect on the motor M, e.g., corrosion, as the first coolant, it is possible to effect heat transfer efficiently by the direct contact between the motor M and the oil. The heat transferred to the oil in this manner can be discharged efficiently to the cooling water (the second coolant) at one heat exchange portion C. Thus, without a complicated circulation passage L for oil passing through the drive unit case 10, the motor M can be cooled efficiently. Furthermore, because the oil cooler C is disposed downstream of the cooling portion H for the inverter U, it is possible to prevent the heat of the oil which has cooled the motor from being transferred to the inverter U which has lower heat resistance than the motor.

Figure 2:
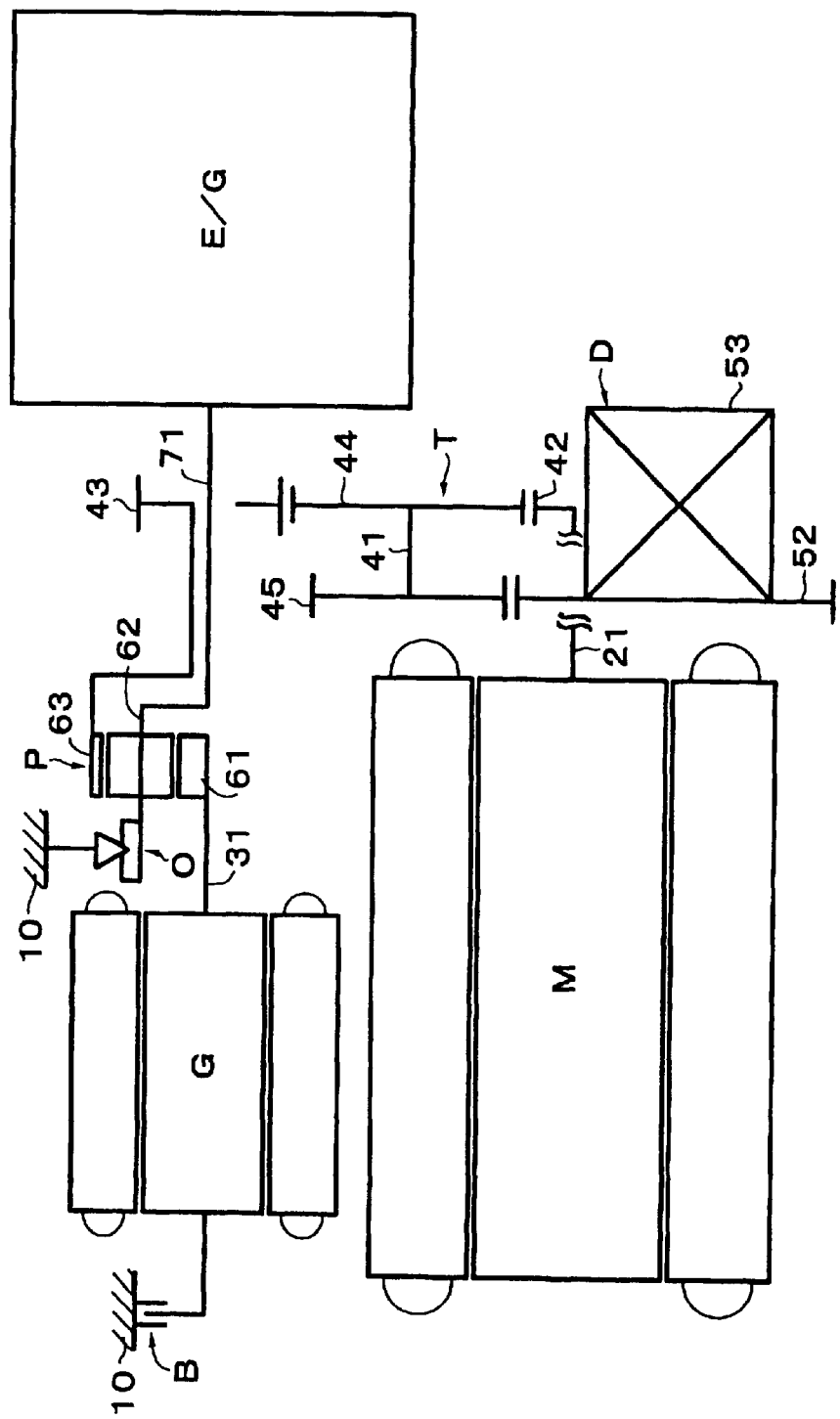
FIG. 2 is a schematic diagram of a second embodiment of the present invention.

FIG. 2 shows a second embodiment of the present invention applied to a hybrid drive unit. This unit includes, as its principal elements, an internal combustion engine (hereinafter referred to as "engine") E/G, an electric motor (hereinafter referred to as "motor") M, an electric generator (hereinafter referred to as "generator") G, and a differential D, with a planetary gear set P of a single pinion construction and a counter gear mechanism T being interposed between these elements. Furthermore, a one-way clutch O and a brake B are also provided.

Figure 3:
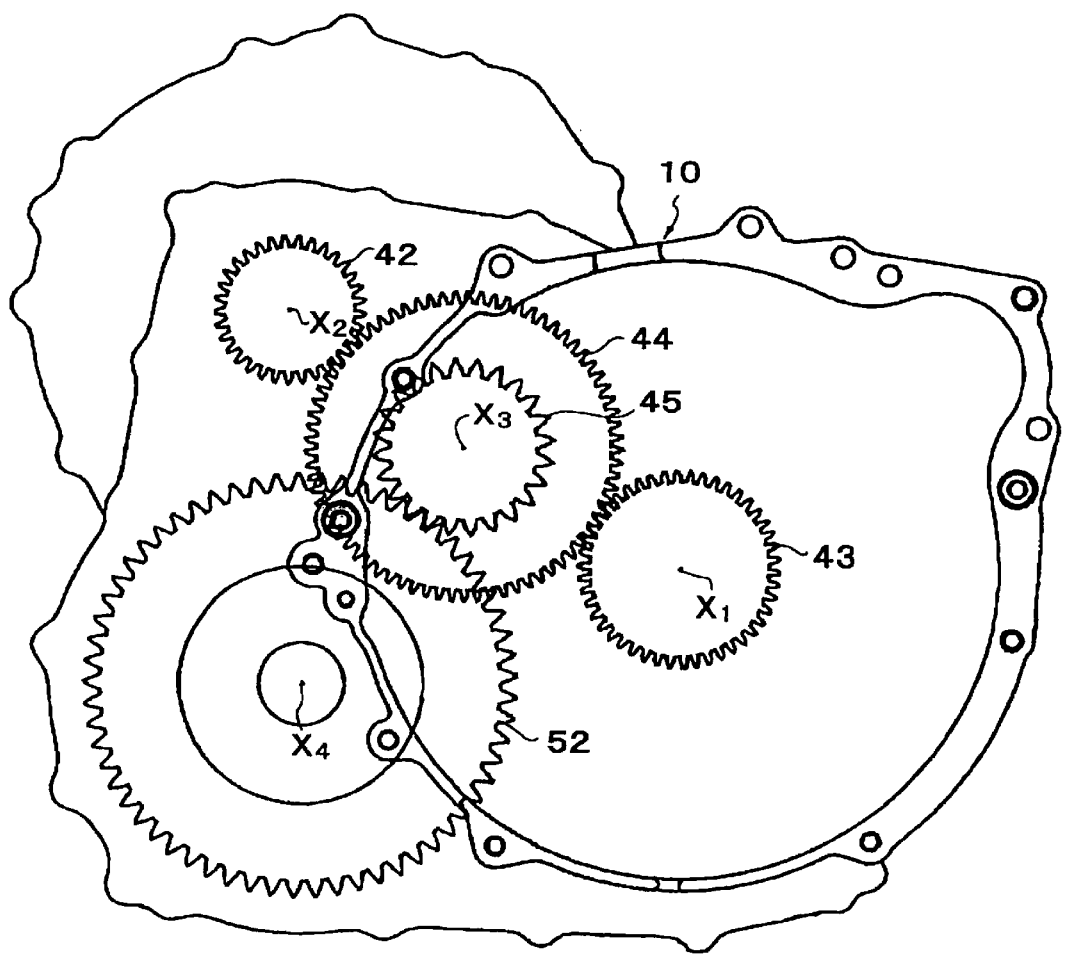
FIG. 3 is a side view showing the relationship between the various axes of the drive unit of the second embodiment.

As illustrated in FIG. 3, the drive unit is of a four-axis construction in which the engine E/G and the generator G are located on a first axis $X_1$, the motor M is located on a second axis $X_2$, the counter gear mechanism T is located on a third axis $X_3$, and the differential D is located on a fourth axis $X_4$, respectively. The engine E/G and the generator G are connected with the differential D through the planetary gear set P and the counter gear mechanism T. The motor M is connected with the differential D through the counter gear mechanism T.

The motor M is connected with the counter gear mechanism T by meshing engagement a counterdrive gear 42, fixed to a rotor shaft 21 of the motor M, with a counterdriven gear 44. The engine E/G is connected with the generator G and the countergear mechanism T by connection of its output shaft 71 with a carrier 62 of the planetary gear set P. The generator G is connected to the engine E/G and the counter gear mechanism T by connection of its rotor shaft 31 with a sun gear 61 of the planetary gear set P. A ring gear 63 of the planetary gear set P is connected with a counterdrive gear 43 on the first axis $X_1$ meshing with the counterdriven gear 44 of the counter gear mechanism T. The counter gear mechanism T includes a counterdriven gear 44 fixed to a countershaft 41, and a differential drive pinion gear 45. The differential drive pinion gear 45 meshes with a differential ring gear 52 fixed to a differential case 53 of the differential D. The differential D is connected with the wheels (not shown) as is conventional.

The one-way clutch O is arranged with its inner race connected to the carrier 62 and its outer race connected to the drive unit case 10 so as to prevent reverse rotation of the carrier 62 by reactive force with a drive unit case 10. Also, the brake B is provided so as to secure the rotor shaft 31 of the generator G with the drive unit case 10, when necessary, to prevent drive loss due to it rotation by the reaction torque when electric generation is unnecessary. The brake B is arranged so that its hub is connected with the rotor shaft 31, and a friction engaging member engages with the brake hub with the drive unit case 10.

In a drive unit of the type described above, though there is a speed reduction by the counter gear mechanism T between the motor M and the wheels, they are directly connected in terms of motive force transmission. In contrast, the engine E/G and the generator G are connected together indirectly in terms of motive force transmission through the planetary gear set P and counter gear mechanism T. As a result, by adjusting the load of the generator G with respect to the ring gear 63, which sustains the vehicle running load through the differential D and the counter gear mechanism T, running with an appropriately adjusted ratio utilizing the engine output for both the driving force and the generation of energy (battery charging), becomes possible. Also, because the reactive force applied to the carrier 62 is reversed by driving the generator G as a motor, in the motor mode the reactive force functions to secure the carrier 62 to the drive unit case 10 through the one-way clutch O so that the output of the generator G can be transmitted to the ring gear 63, thereby making it possible to increase the driving force for vehicle take-off by simultaneous output of the motor M and the generator G (running in parallel).

Figure 4:
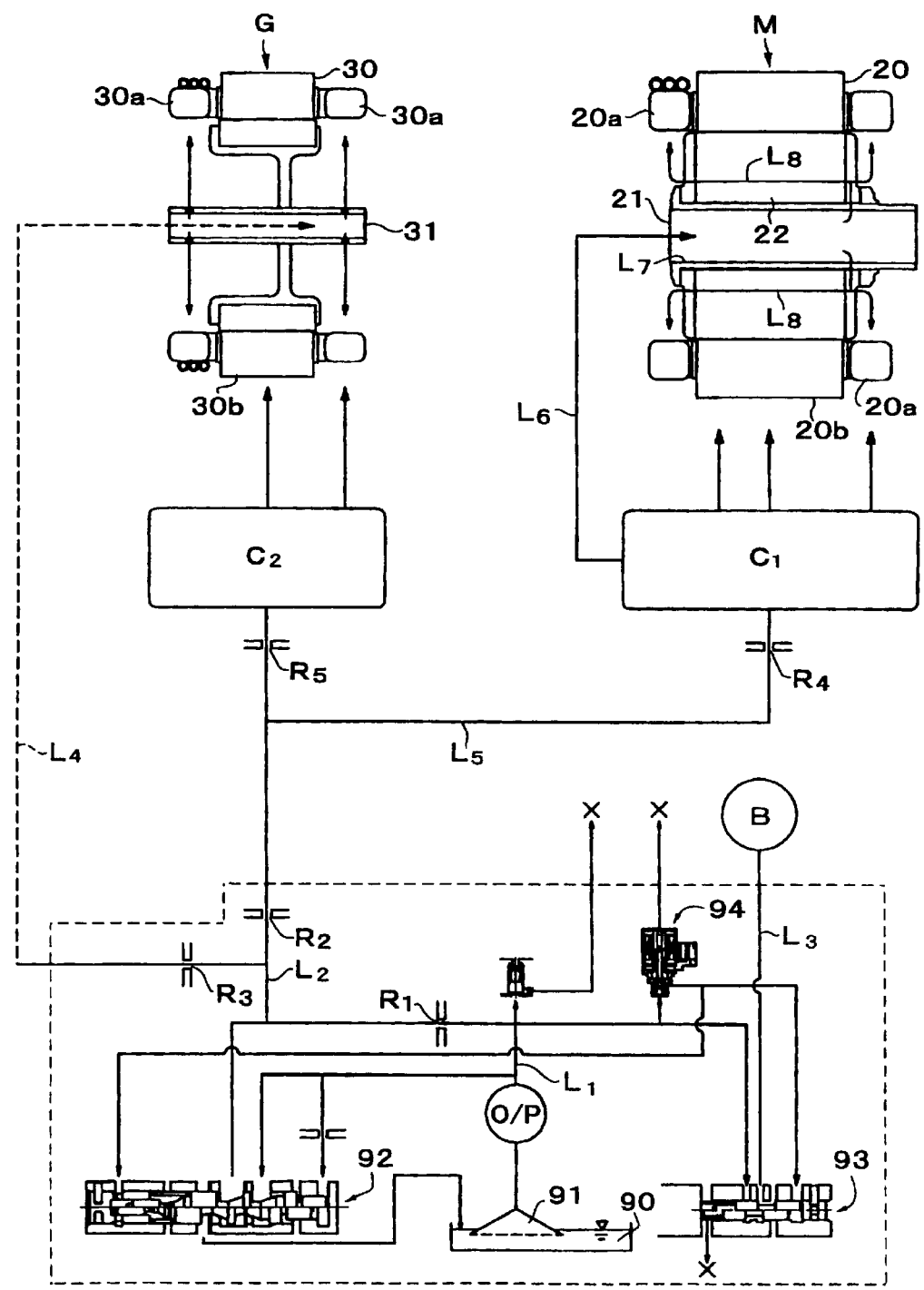
FIG. 4 is a diagram of the hydraulic circuit of the second embodiment.

FIG. 4 shows a hydraulic circuit for the hybrid drive unit. This circuit includes, as its major elements, an oil sump 90 formed in the bottom of the drive unit case 10, an electric oil pump O/P which takes up oil through the strainer 91 from the oil sump 90 and discharges it into the circuit, a regulator valve 92 which establishes circuit line pressure, a brake valve 93 for controlling engagement/disengagement of the brake B, and a solenoid valve 94 for controlling switching of the brake valve 93. Thus, this hydraulic circuit functions as a control circuit for feeding oil to the oil supply passage $L_2$, as a coolant for cooling the motor M and the generator G, and as a lubricant. This same hydraulic circuit controls the brake B by controlling communication between hydraulic servo supply oil passage $L_3$ of the brake B, the line pressure oil passage $L_1$, and the drain.

The line pressure oil passage $L_1$ on the discharge side of the oil pump O/P is branched, with one branch connected to the supply oil passage $L_2$ to the regulator valve 92, and the other branch connected to the supply oil passage $L_3$ of the hydraulic servo of the brake B through the brake valve 93. The line pressure oil passage $L_1$ and the supply oil passage $L_2$ are connected together through an orifice $R_1$. The supply oil passage $L_2$ is also branched, with the respective branches passing through orifices $R_2$, $R_3$. One branch is connected to the oil passage in rotor shaft 31 of the generator G through an oil passage $L_4$ as shown by the broken line, and the other branch is further branched at an oil passage $L_5$ in the case, and they are connected to an oil container $C_1$ for the motor M and an oil container $C_2$ for the generator G provided in the upper part of the drive unit case, through orifices $R_4$, $R_5$, respectively.

For cooling the motor M, oil is fed from the coolant container $C_1$, through an oil passage $L_6$ in the case, through an oil passage $L_7$ in the rotor shaft 21, through an oil passage $L_8$ in the rotor 22, and is discharged by centrifugal force generated by the rotation of the rotor 22 toward coil ends 20a of the stator 20. In this way, by passage through the oil passage in the rotor 22, the rotor is also cooled. Further cooling is provided by the oil discharged from both ends of the rotor 22 onto to the coil ends 20a and by the oil discharged directly from the coolant container $C_1$ onto the stator core 20b and the coil ends 20a. In the same manner, cooling of the generator G is provided by the oil discharged by centrifugal force from the oil passage in the rotor shaft 31 of the generator G, through the radial oil hole, and onto the coil ends 30a at opposite ends of the stator 30 and by the oil discharged from the coolant container $C_2$ onto the stator core 30b and coil ends 30a. The oil which has thus cooled the motor M and the generator G, and which has risen in temperature, drops into the bottom part of the drive unit case or runs down along the case wall so as to be recovered in the oil sump 90 disposed underneath the drive unit.

Figure 5:
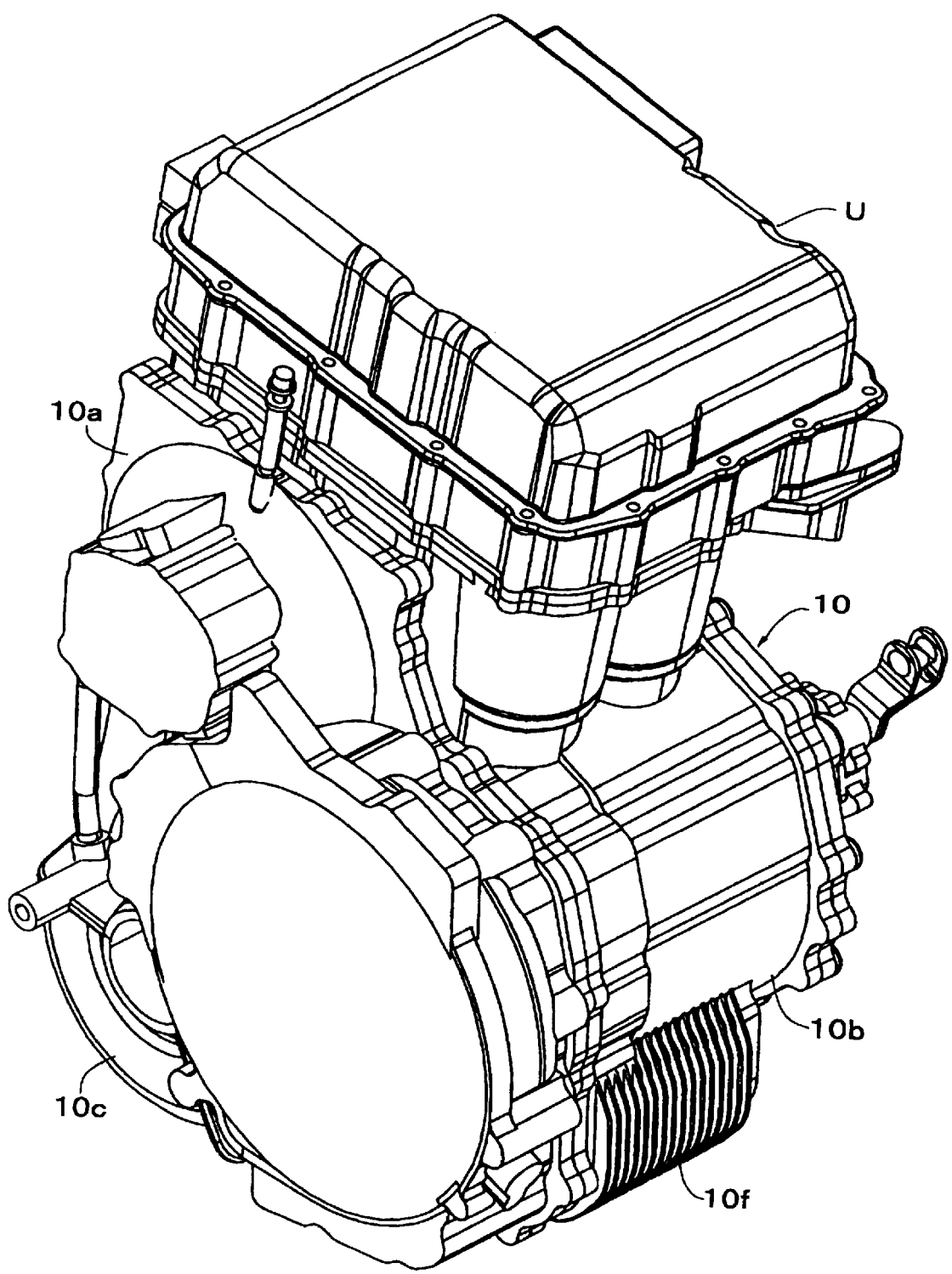
FIG. 5 is a perspective view of the drive unit with integrated inverter of the second embodiment.

FIG. 5 is a perspective view of the drive unit. A large number of heat radiation fins 10f are formed integrally with the case 10 on the outer wall of the portion of the drive unit case 10 (an aluminum material) housing the oil sump, so that the oil recovered in the oil sump is air cooled by air-flow through the engine compartment. In FIG. 5, a reference numeral 10a denotes a motor accommodating portion in the drive unit case, 10b denotes a generator accommodating portion, and 10c denotes a differential accommodating portion. An inverter U for controlling the motor and the generator (hereinafter referred to as "inverter", a general term for inverters for motors and inverters for generators) is, as shown in FIG. 5, mounted on the upper part of and integrated with the drive unit case 10.

Figure 6:
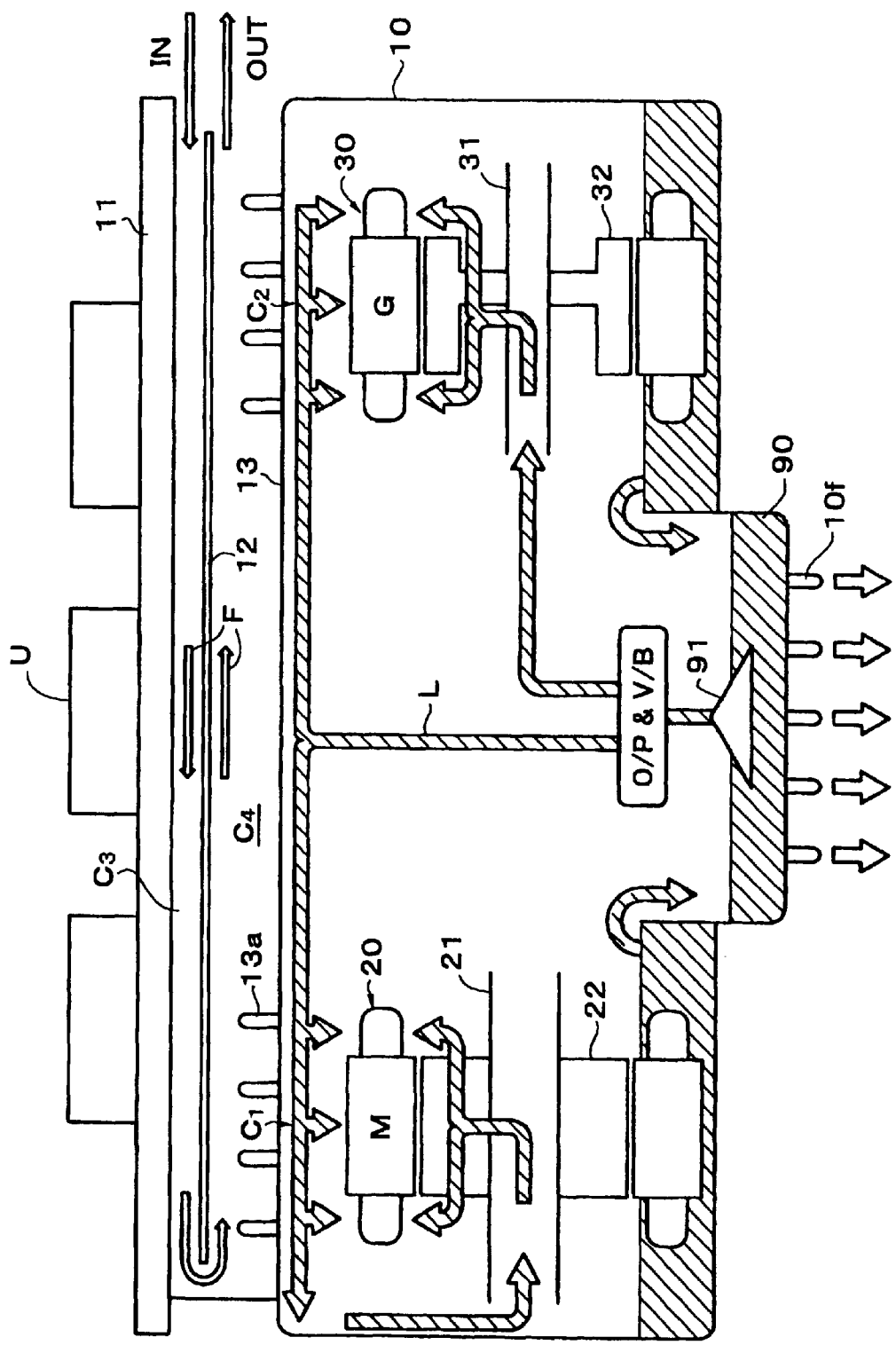
FIG. 6 is a schematic diagram showing flow of coolant in the second embodiment.

FIG. 6 shows the cooling system schematically and illustrates the flow paths of the coolants. As shown in FIG. 6 this cooling system is formed by a circulation passage L (shown as wide arrows with hatching in the figure) utilizing oil as the first coolant and a flow passage F (shown as white arrows with fine outline) utilizing cooling water as the second coolant. The first coolant (oil) is taken up by the oil pump O/P from the oil sump 90 through the strainer 91, and cools the generator G and the motor M in the sequence as previously described, after which it is once again collected in the bottom of the generator G accommodating portion and the bottom of the motor M accommodating portion of the drive unit case 10 so as to maintain a certain oil level that does not come into contact with the lowermost parts of the rotors 22 and 32, and then the overflows into the oil sump 90, thereby ending one cycle of circulation.

The second coolant (water) serves to cool the first coolant by heat exchange therewith through a heat transfer wall 13 of the drive unit case 10. For this purpose, the second coolant is passed through a flow passage defined between the inverter panel 11, made of an aluminum material having good heat conductivity, and the heat transfer wall 13 of the drive unit case 10. In this embodiment, a partition 12, integral with the inverter panel 11 or the drive unit case 10 or separate from both, is provided between the inverter panel 11 and the heat transfer wall 13. Further, the cooling water flow cools the inverter U by heat exchange through the inverter panel 11 while flowing through that portion of the passage F defined between the inverter panel 11 and the partition 12, and the oil is cooled by heat exchange with the oil through the heat transfer wall 13 while flowing between the partition 12 and the heat transfer wall 13 of the drive unit case 10.

Figure 7:
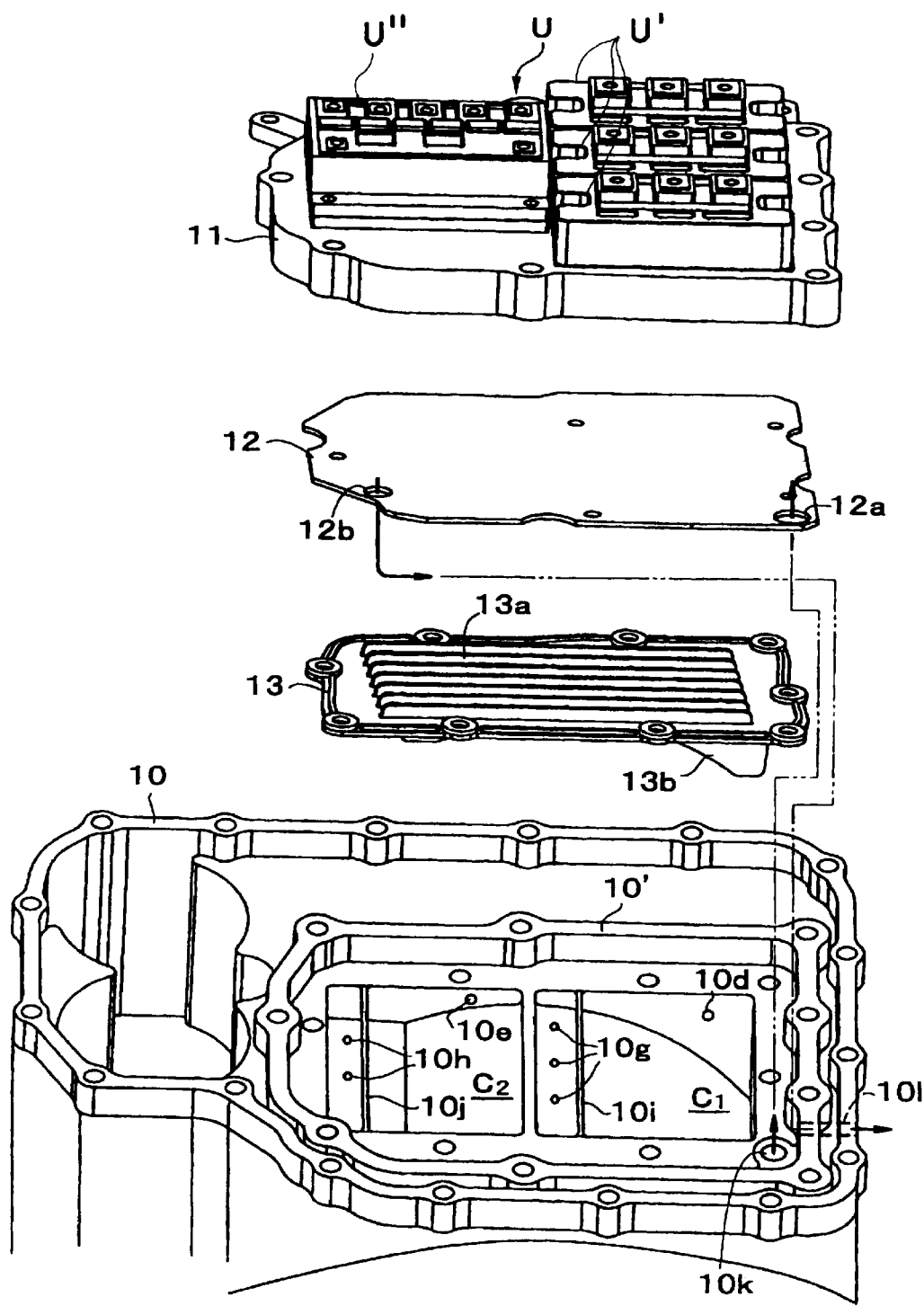
FIG. 7 is an exploded view showing, in detail, components of the second embodiment viewed from above.

FIG. 7 shows inverter U' for the motor and inverter U" for the generator (collectively, inverter U), mounted on inverter panel 11. As further shown in FIG. 7, the inverter panel 11 is mounted on wall 10' integral with and extending upwardly from the drive unit case 10, so that the cooling water flow passage F is substantially contained in the upper part of the drive unit case 10. However, this relationship may be reversed by providing a surrounding wall integral with and extending downward from the inverter panel 11, thereby forming a U-shaped sectional lid member open on its lower side and placed on the upper part of the drive unit case 10, so that the flow passage F for cooling water is substantially internally contained within the inverter panel 11.

As seen in FIGS. 7–10, the coolant containers $C_1$, $C_2$ are provided on the upper part of the motor accommodating portion of the drive unit case 10. The coolant container $C_1$ holds coolant for the motor and the coolant container $C_2$ holds coolant for the generator. Within the flow passage $L_5$ (see FIG. 4) for the first coolant leading to both of these coolant containers $C_1$, $C_2$, there are provided orifices $R_4$, $R_5$ having different apertures for distributing amounts of oil to both coolant containers $C_1$, $C_2$ according to the thermal loads of the motor M and the generator G. Oil passage $L_5$ opens at inlets 10d, 10e, on the sides of the coolant containers $C_1$, $C_2$ as seen in FIG. 7. As also seen in FIG. 7, dams 10i, 10j are provided in positions near the outlet sides of both coolant containers. Further, downstream of the dams 10i, 10j of both coolant containers are formed oil outlets log, 10h which are open to the bottom faces of those coolant containers and which function as orifices for adjusting the discharge flows by the setting of their apertures.

Figure 9:
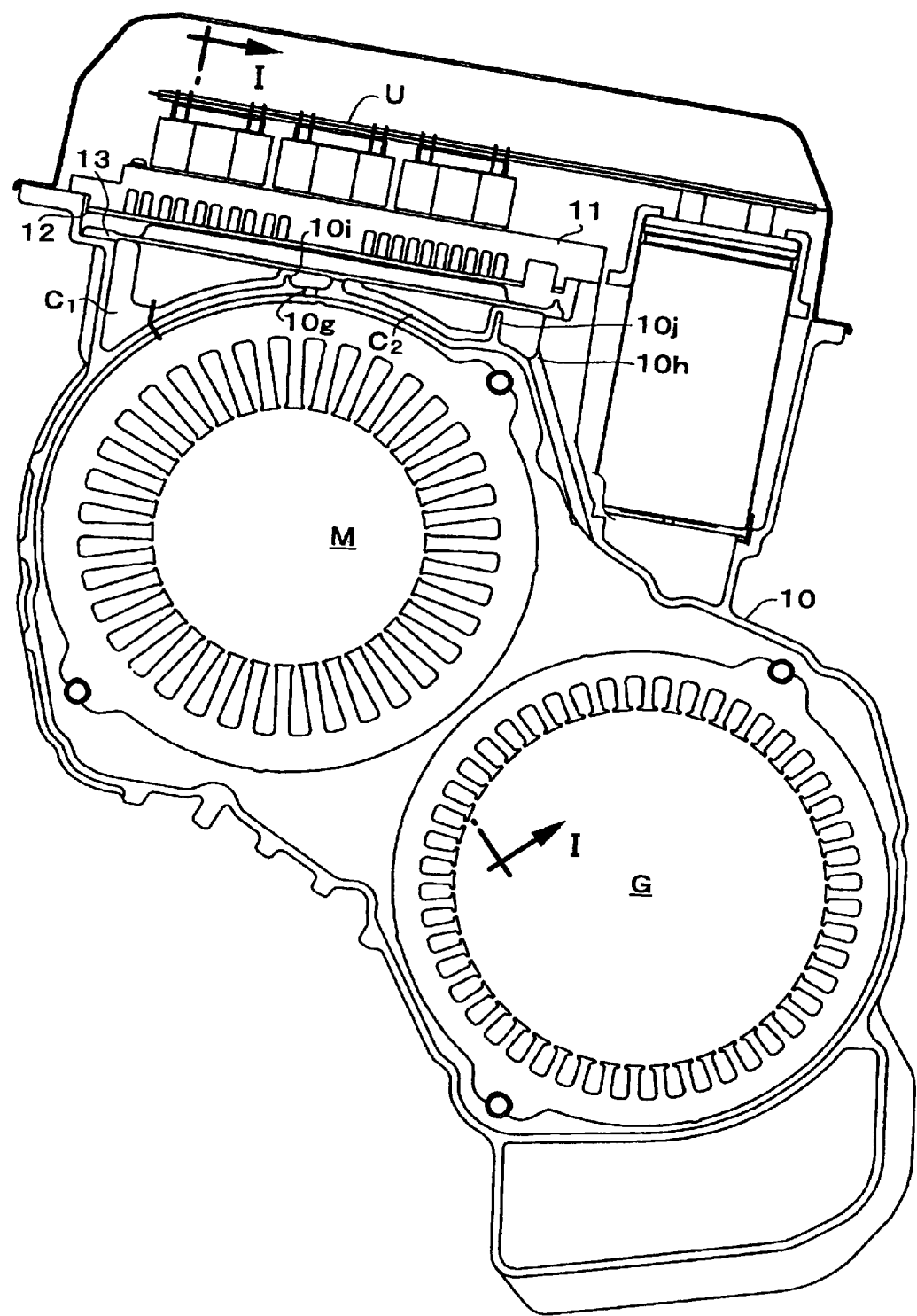
FIG. 9 is a sectional view of the second embodiment.
Figure 10:
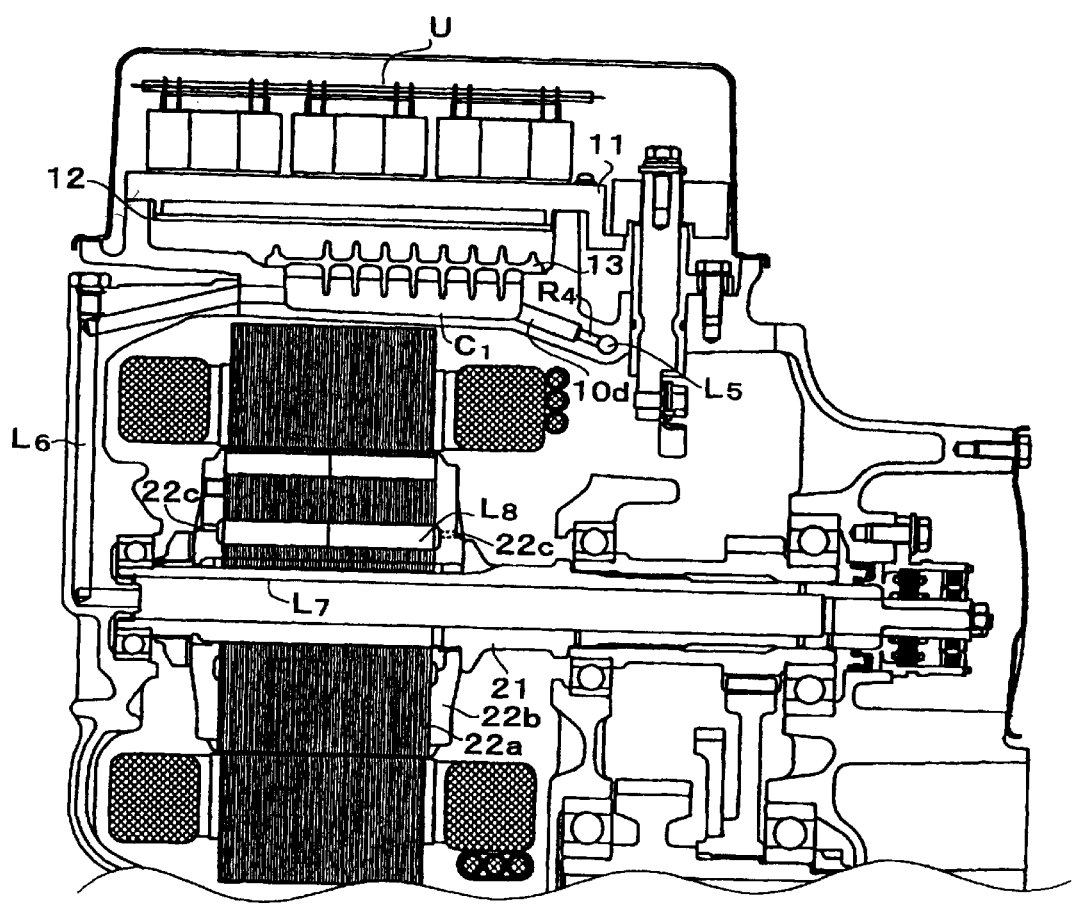
FIG. 10 is a sectional view taken along line I—I in FIG. 9.

The subsequent course of flow of the first coolant is illustrated in FIG. 10. FIG. 10 shows that the oil outlet log is connected to the intra-axial oil passage $L_7$ at the shaft end of the stator shaft 21 of the motor M, with the intra-case oil passage $L_6$ formed in the drive unit case utilized as the flow passage. The intra-axial oil passage $L_7$ communicates through a radial hole, with the peripheral groove formed in end plates 22b supporting opposing ends of a core 22a of the motor M. A plurality of intra-rotor oil passages $L_8$ extend axially through the core 22a and connect the peripheral grooves with discharge holes 22c formed in the end plates 22b. In the drawing, both ends of one intra-rotor oil passage $L_8$ are shown leading to discharge holes 22c, but actually, only one end of each intra-rotor oil passage $L_8$ leads to a discharge hole 22c, alternative passages $L_8$ leading to the left and right end plates, respectively, thereby preventing an imbalance in the amount of oil between the rotor oil passages $L_8$. Also, the oil outlet 10h is above the stator of the generator G and is fed oil through the intra-case oil passage, as shown in FIG. 9.

The heat transfer wall 13 of the drive unit case 10 which closes the upper opening of the coolant containers $C_1$, $C_2$ and which forms the wall of the heat exchange portion is provided with a large number of cooling fins 13a, 13b on its upper and lower faces, and is constructed of an aluminum material or the like having good heat conductivity similar to the drive unit case 10. In this embodiment, the heat transfer wall 13 is a member independent from the drive unit case 10 for convenience of manufacture, and is fixed to the drive unit case 10 by bolts or the like. The oil cooling fins 13b on the lower face side of the heat transfer wall 13 vary in height so as to correspond to the shape of the bottoms of the coolant containers $C_1$ and $C_2$, as shown in FIG. 9. The arrangement is such that the fins are positioned over the entire area of the coolant containers $C_1$ and $C_2$ so as to improve heat transfer.

Figure 8:
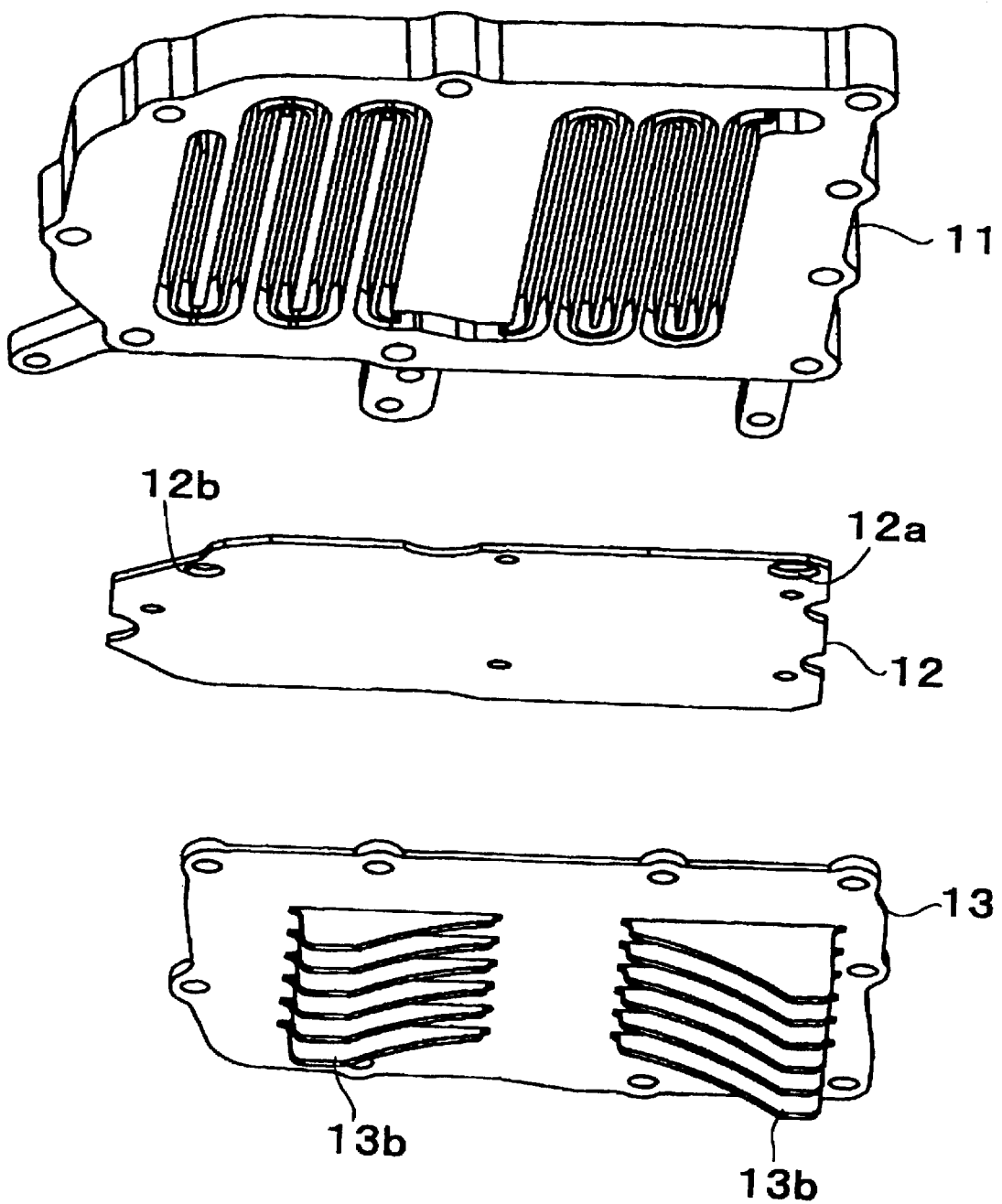
FIG. 8 is an exploded view showing several of the components shown in FIG. 7 viewed from below.

The inverter panel 11 supports a power module serving as the inverter U and serves as a cooling means for the inverter U. In this embodiment the inverter panel 11 serves as a heat sink for improving the heat exchange efficiency and, as seen in FIG. 8, it is internally provided with two narrow flow passages in parallel turning back and forth in serpentine fashion. In this flow passage, this embodiment provides a partition 12 made of a material having high heat insulating property which is a member separate from the case and the inverter panel and which is mounted abutting the lower face of the inverter panel 11. Accordingly, as shown in FIG. 6, the first chamber $C_3$ on the inverter side and the second chamber $C_4$ on the drive unit side are separated and defined by the partition 12, the inverter panel 11 and the drive unit case 10. The chambers $C_3$, $C_4$ are inter-connected by the through-hole 12b.

In the above-described unit of such a construction, flow oil fed to the coolant containers $C_1$, $C_2$ from the respective inlets 10d, 10e is obstructed by the respective dams 10i, 10j and stored for a certain duration of time. The oil overflowing dams 10i, 10j contacts the oil cooling fins 13b on the lower face side of the heat transfer wall 13 to effect sufficient heat exchange. Then, the oil portions overflowing the dams 10i, 10j are adjusted to amounts necessary for the motor M and the generator G and discharged from the outlets 10g, 10h. Meanwhile, the cooling water passes through a hole 12a of the partition 12 from an inlet 10k open on the upper face of the drive unit case 10 into the heat sink of the inverter panel 11, i.e., the first chamber $C_4$, and heat exchange thereby occurs. Then, the cooling water is circulated between the heat transfer wall 13 and the partition 12, through the through-hole 12b of the partition 12, and then it runs across the heat transfer wall 13 while contacting the water cooling fins 13a on the upper face thereof. The cooling water then exits the drive unit case 10 through a cooling water outlet 10l formed in the surrounding wall around the opening of the coolant container. The cooling water discharged from the drive unit case 10 is cooled by the engine radiator for cooling the engine or by a separate cooler, dedicated exclusively to such use.

In the second embodiment described above, because the sequence is such that the cooling water first cools the power module constituting the inverter U through the inverter panel 11 and then cools the motor M and the generator G through the oil, the cooling water does not undergo heat exchange directly with the motor M and the generator G or simultaneously with the inverter U. Therefore, it is possible to prevent the cooling water temperature from rising above that which can be tolerated by the inverter U. Accordingly, it is possible to cool the inverter U, motor M, and generator G efficiently and to improve cooling performance. Also, as the flow passage of cooling water is formed in the space between the integrated inverter U and the drive unit case 10, the conventional, complicated construction in which a separate, dedicated cooling channel is provided around the drive unit case can be avoided, thus improving space efficiency and reducing cost. Furthermore, by separately providing a coolant container $C_1$ for the motor and a coolant container $C_2$ for the generator, it becomes possible to individually adjust the amount of oil to be supplied to the electric motor M and the electric generator G, respectively. Accordingly, by adjusting the ratio of flows with the orifices $R_4$, $R_5$ having different apertures and supplying the proper amounts of oil to the motor M and the generator G, both can be effectively cooled according to their cooling temperature requirements. Furthermore, the oil, after heat exchange in the coolant containers $C_1$, $C_2$, is fed to the rotors of the motor M and the generator G from which it is discharged from the rotor by centrifugal force, thus further cooling the stators 20, 30. In the foregoing manner, highly efficient motor cooling can be provided by utilizing oil circulation to the utmost extent.

Figure 11:
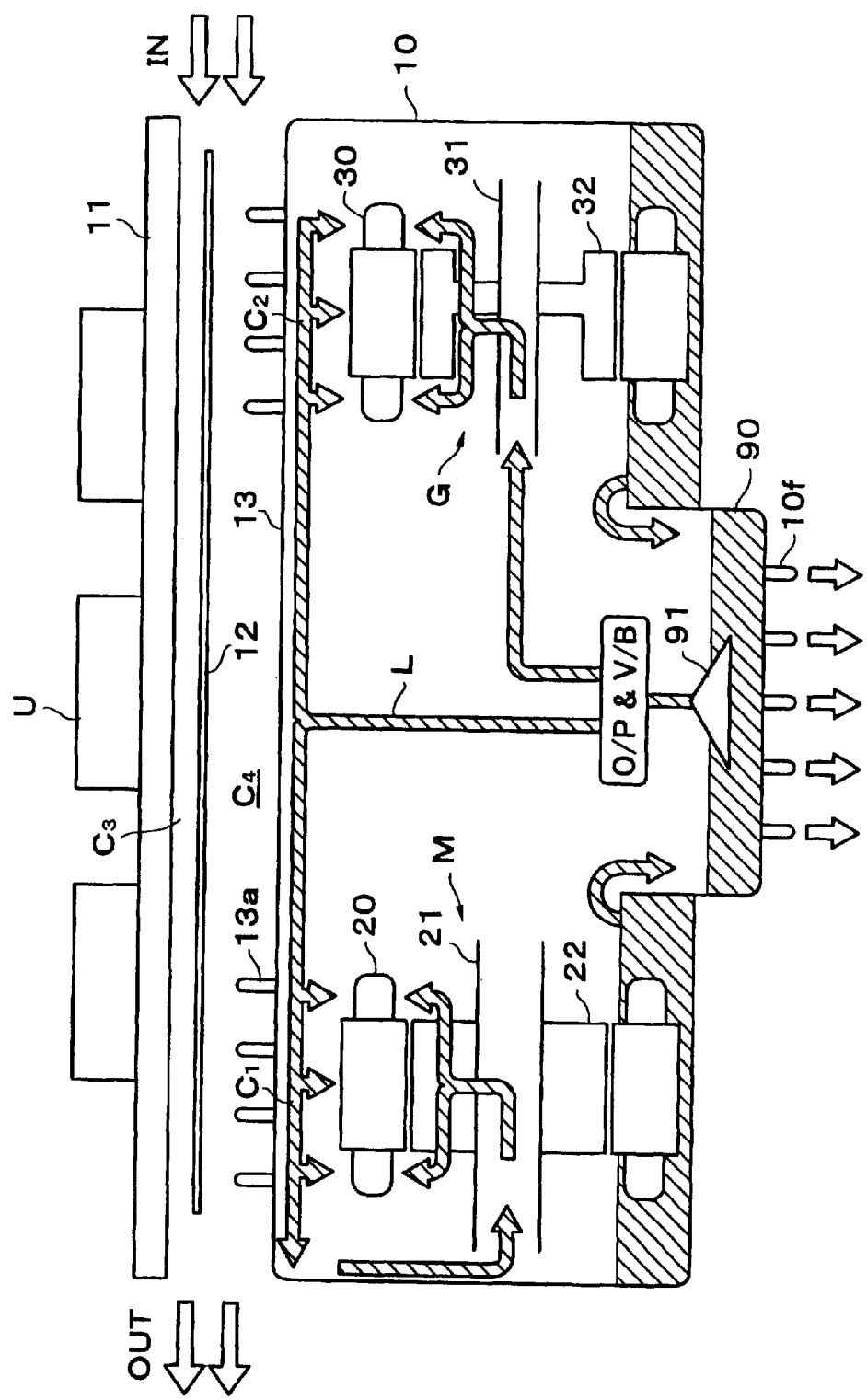
FIG. 11 is a schematic diagram showing a coolant flow in a third embodiment of the present invention.

While in the second embodiment the flow of the cooling water is in series through the first chamber $C_3$ on the inverter side and then through second chamber $C_4$ on the coolant container side by reversing direction, as seen in FIG. 6, flows through chamber $C_3$, $C_4$ may also be in parallel. FIG. 11 shows such parallel flows in a third embodiment, in a schematic view similar to that of FIG. 6. In this third embodiment, the first chamber $C_3$ facing the inverter and the circulation passage L for the second chamber $C_4$ facing the heat transfer wall 13, are totally separated by the partition 12 and connect in parallel with the circulation passage for the second coolant. As the remainder of this third embodiment is substantially the same as the second embodiment described above, the corresponding components are indicated by the same numerals and are not again described (in this respect, same thing applies to subsequent embodiments).

With the flow configuration of the third embodiment, it is possible to pass cooling water at a lower temperature to the second chamber $C_4$ side facing the heat transfer wall 13 of the coolant container, so that the cooling efficiency of the motor M and the generator G can be further enhanced.

Figure 12:
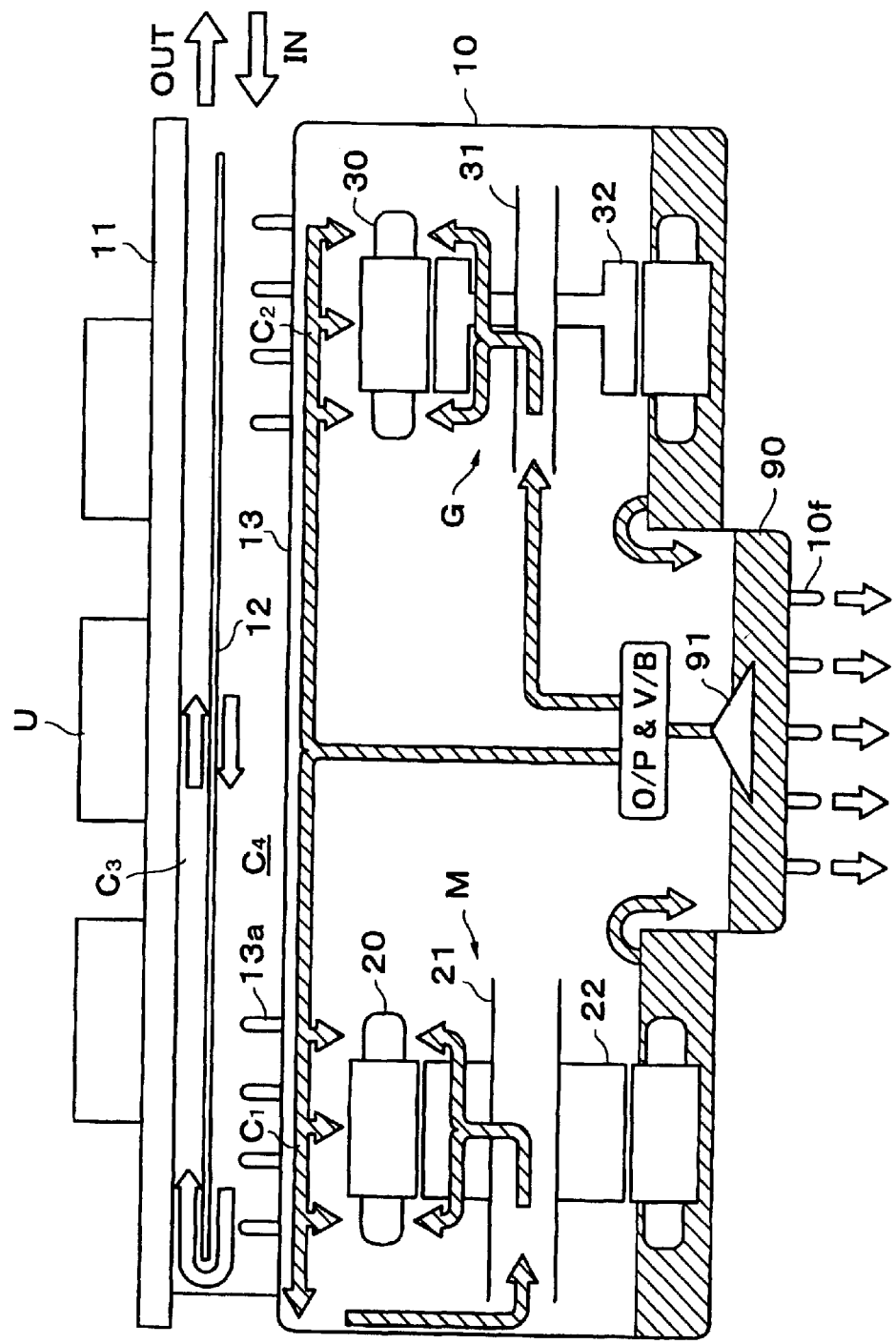
FIG. 12 is a schematic diagram showing a coolant flow in a fourth embodiment of the present invention.

FIG. 12 shows a fourth embodiment in which the relative vertical positions of the first chamber $C_3$ on the inverter U side and the second chamber $C_4$ on the coolant container side are, effect, reversed. In this embodiment, the cooling water firstly flows through the second chamber $C_4$ facing the heat transfer wall 13, and thereby cools the oil through the heat transfer wall 13, and then flows through the first chamber $C_3$ facing the inverter to cool the power module of the inverter U.

Again in the foregoing embodiment, the cooling structure is such that the cooling water (second coolant) does not directly cool the motor M and the generator G but, rather, cools the oil which, in turn, cools the motor and generator by direct contact therewith. The cooling water then cools the inverter U. Thus, the heat from the motor M and the generator G is heat exchanged by the cooling water through the oil. Accordingly, heat is reduced relative to case of direct heat transfer, and there is the advantage of preventing the temperature of the cooling water from rising above the heat resistant temperature of the inverter U.

Figure 13:
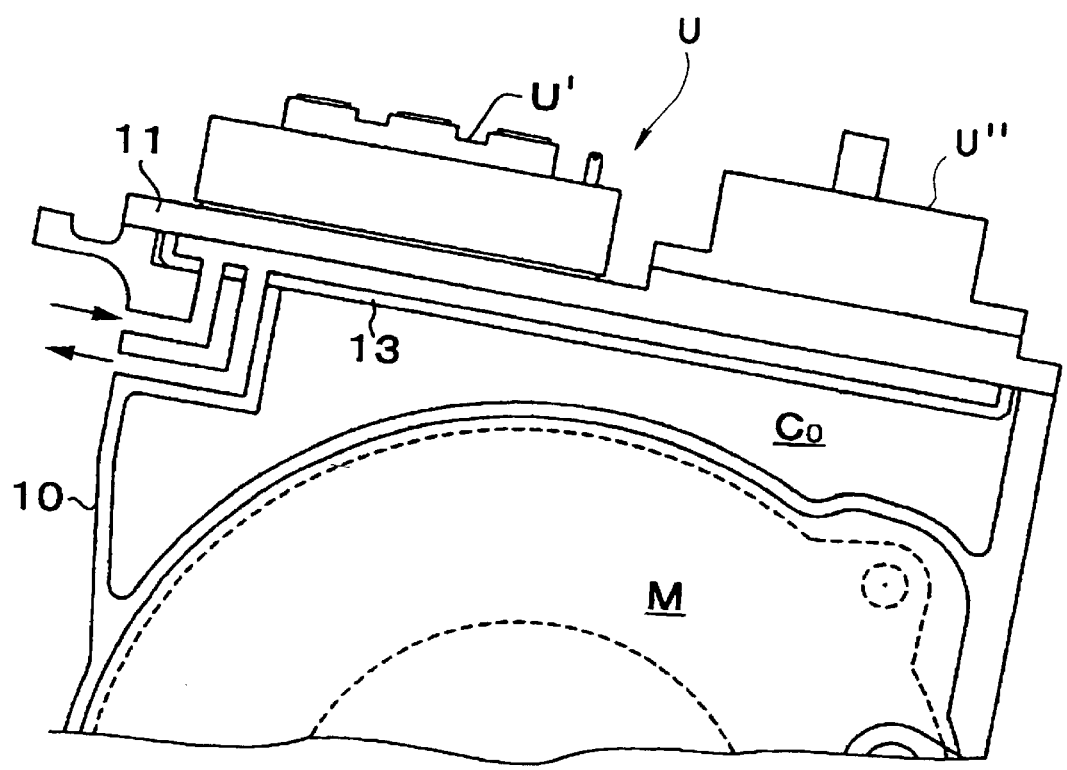
FIG. 13 is a schematic, partial sectional view of a fifth embodiment of the present invention.
Figure 14:
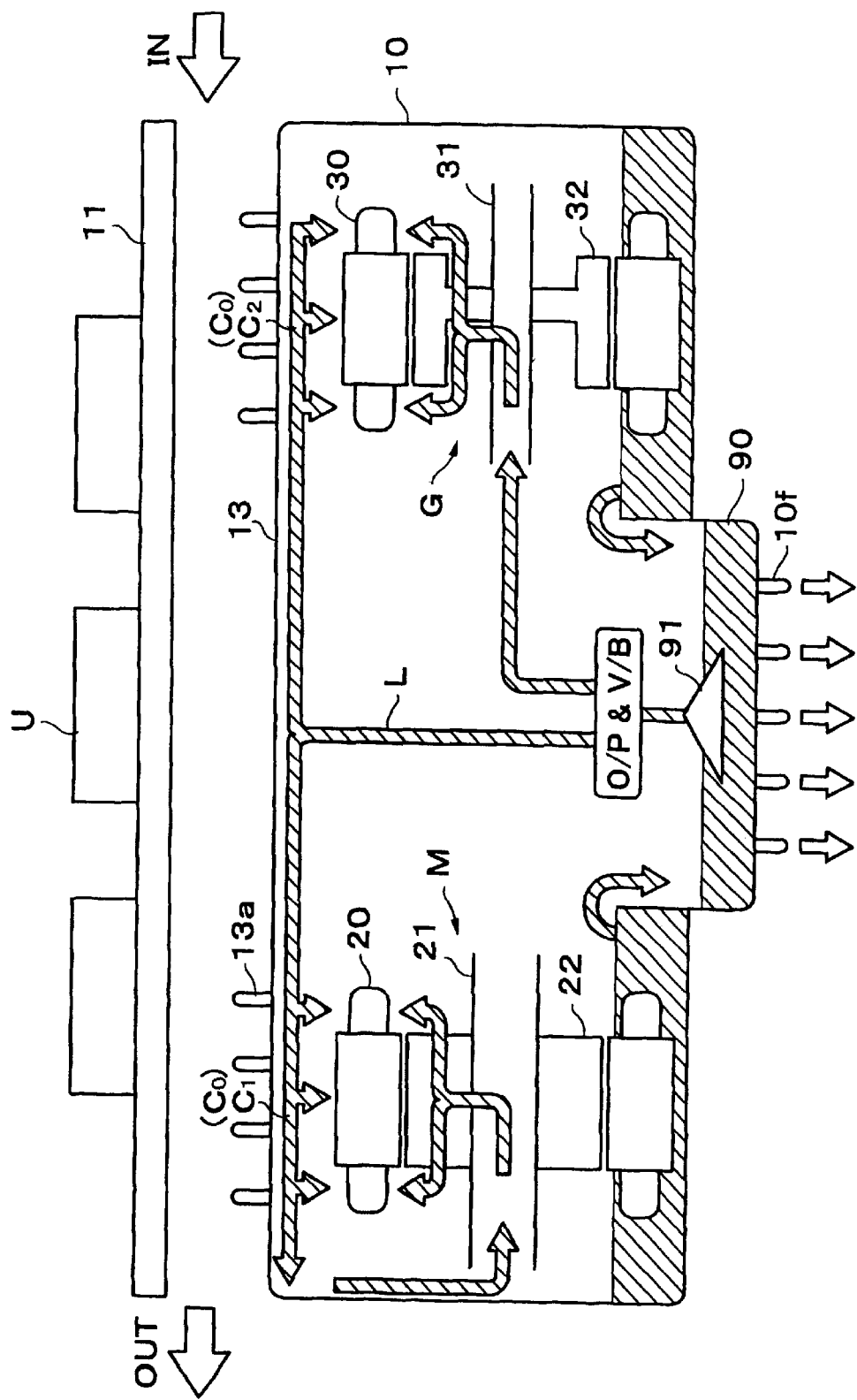
FIG. 14 is a schematic diagram showing a coolant flow in a fifth embodiment.

FIG. 13 and FIG. 14 schematically show a fifth embodiment of the present invention with further simplification. In this fifth embodiment, division of the coolant container is eliminated so that there is a single coolant container $C_0$ so as to simplify the construction of the cooling water flow passage side by omitting the partition (12 in earlier described embodiments). The thus simplified construction is applicable both to a drive unit in which the motor M and the generator G are provided separately and a drive unit using the motor also as the generator.

In the fifth embodiment, the heat transfer to the cooling water as the second coolant is conducted simultaneously on the inverter U side and the coolant container $C_0$ side where oil is employed as the first coolant. The heat from the motor M or the generator G or from both is reduced by heat exchange with cooling water through the oil in the coolant container $C_0$, so that the temperature of the cooling water can be prevented from rising above the heat resistant temperature of the inverter U. In addition, the oil circulating in the drive unit case 10 is, after cooling the motor M or the generator G or both, collected underneath the drive unit case 10, where it is air-cooled and re-circulated. Therefore, by positioning the coolant container $C_0$ on the upstream side in the oil circulation passage, the oil immediately after the start of the circulation following air-cooling is further cooled by cooling water, thereby enabling the cooling of the motor M and/or the generator G to be improved. Accordingly, in this case as well, the inverter U and the motor M or the generator G, or all three can be cooled more efficiently.

Figure 15:
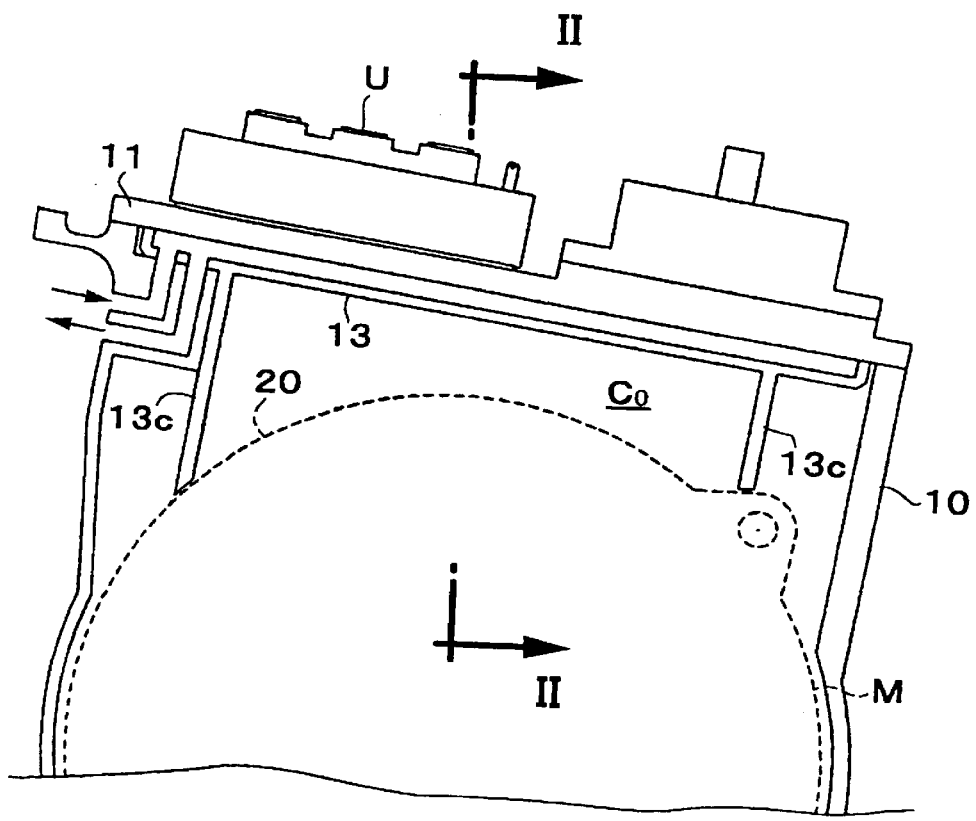
FIG. 15 is a schematic sectional view of a sixth embodiment of the present invention.
Figure 16:
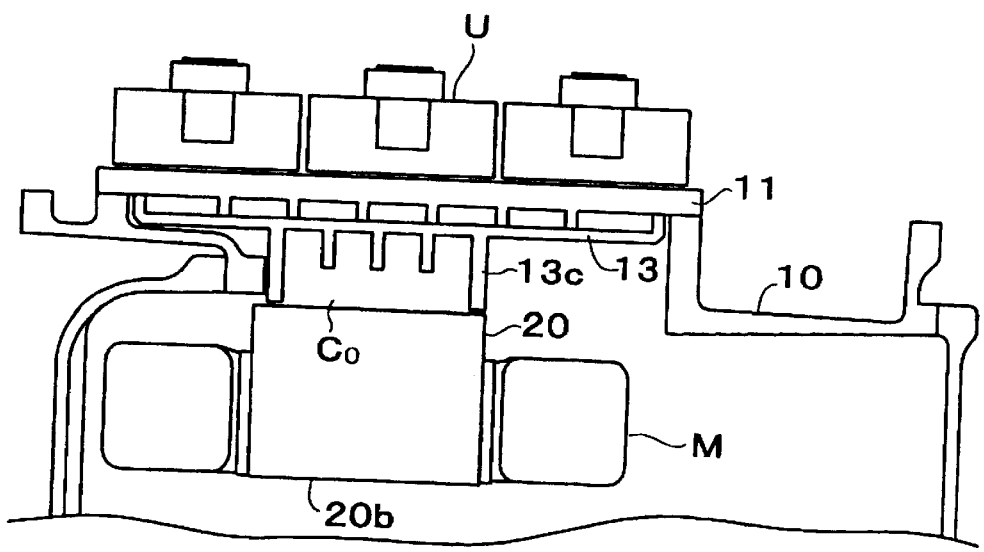
FIG. 16 is a sectional view taken along line II—II in FIG. 15.

Whereas, in the respective embodiments above, the coolant containers $C_0$, $C_1$, and $C_2$ are formed as spaces defined by the drive unit case 10 and the heat transfer wall 13, other configurations may be employed. FIG. 15 and FIG. 16 show a sixth embodiment adopting such a variation. In this embodiment, the coolant container $C_0$ is defined by the stator 20 of the motor M, without interposing a sealing member, by utilizing the fact that the coolant is oil so that even if it leaks to the motor side, it should not cause any problem. In this case, particularly, with respect to the peripheral wall surrounding the coolant container $C_0$, a case wall similar to that of the second embodiment above may be adopted. However, in this embodiment, the surrounding wall 13c extends downward from the heat transfer wall 13, and the bottom wall of the coolant container $C_0$ is the outer periphery of the core 20b of the stator 20 of the motor M. In this configuration as well, similar to the fifth embodiment, the partition is omitted from the flow passage for the second coolant, so that the cooling water is in simultaneous contact with the inverter panel 11 and the heat transfer wall 13. In this case as well, to further improve cooling efficiency, it is possible to employ a cooling water flow passage design similar to that of the second embodiment.

In the sixth embodiment, the iron core which forms the stator 20 of the motor M and the oil come into direct contact therewith, without being mediated by the wall of the drive unit case 10, thereby cooling the motor M more effectively. Also, when the surrounding wall 13c of the coolant container $C_0$ is a member separate from the heat transfer wall, as described above, there is the advantage that the structure for circulating the oil in the drive unit case 10 can be further simplified.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A drive unit for a vehicle comprising:

a drive unit case;

an electric motor mounted within said drive unit case;

a first circulation passage for a first coolant, for cooling said electric motor, within the drive unit case;

an inverter for controlling said electric motor; and a second circulation passage for a second coolant separate from said first circulation passage and including a heat exchange portion within a drive unit case, for heat exchange between the first and second coolants, and a cooling section for cooling the inverter, whereby the first coolant for cooling the electric motor is cooled by the second coolant.

2. A drive unit according to claim 1, wherein said heat exchange portion is disposed downstream of said cooling section in the second circulation passage.

3. A drive unit according to claim 1, further comprising an inverter panel mounted on the drive unit case, said inverter being mounted on the inverter panel, and wherein said second circulation passage includes a flow passage for the second coolant formed between said inverter panel and the circulation passage for the first coolant, and the inverter panel serves as the cooling section for the inverter.

4. A drive unit according to claim 3, further comprising a partition dividing said flow passage for the second coolant into a first chamber on the inverter side and a second chamber on the side of said first circulation passage, said first and second chambers being interconnected in series for flow of the second coolant, in sequence, through the first chamber and then through the second chamber.

5. A drive unit according to claim 3, further comprising a partition dividing said flow passage for the second coolant into a first chamber on the inverter side and a second chamber on the side of said first circulation passage, and wherein said first and second chambers are connected in parallel to the second circulation passage.

6. A drive unit according to claim 3 further comprising an electric generator and a circulation passage for the first coolant, for cooling the electric generator, formed in the drive unit case, and an inverter for controlling the electric generator, mounted on said inverter panel.

7. A drive unit according to claim 4 further comprising an electric generator and a circulation passage for the first coolant, for cooling the electric generator, formed in the drive unit case, and an inverter for controlling the electric generator, mounted on said inverter panel.

8. A drive unit according to claim 5 further comprising an electric generator and a circulation passage for the first coolant, for cooling the electric generator, formed in the drive unit case, and an inverter for controlling the electric generator, mounted on said inverter panel.

9. A drive unit according to claim 3, wherein said drive unit case includes a coolant container for the first coolant in a position facing the flow passage for the second coolant.

10. A drive unit according to claim 9, wherein said coolant container is divided into two parts, one for said electric motor and one for an electric generator.

11. A drive unit according to claim 10, wherein at least one orifice is provided in said first circulation passage for distributing and changing the ratio of portions of the first coolant to the two parts of the coolant container.

12. A drive unit according to claim 9, wherein said coolant container has a dam in the vicinity of an outlet thereof.

13. A drive unit according to claim 9, wherein said coolant container is partially defined by a stator of the electric motor or of an electric generator.

14. A drive unit according to claim 9, wherein said first circulation passage includes a flow passage through a rotor of the electric motor downstream of the coolant container, said flow passage discharging the first coolant through a discharge hole provided in the rotor.

* * * * *

UNITED STATES PATENT AND TRADEMARK OFFICE
CERTIFICATE OF CORRECTION

PATENT NO. : 6,323,613 B1
DATED : November 27, 2001
INVENTOR(S) : Hara et al.

It is certified that error appears in the above-identified patent and that said Letters Patent is hereby corrected as shown below:

<u>Column 7,</u>
Line 53, "log" should read -- 10g --; and
Line 58, "log" should read -- 10g --.

<u>Column 8,</u>
Line 44, "10jand" should read -- 10j and --.

Signed and Sealed this

Eleventh Day of June, 2002

Attest:

JAMES E. ROGAN
Attesting Officer
Director of the United States Patent and Trademark Office